(12) United States Patent
Duan et al.

(10) Patent No.: US 9,246,748 B2
(45) Date of Patent: Jan. 26, 2016

(54) OPTICAL CHANNEL DATA UNIT SWITCH WITH DISTRIBUTED CONTROL

(71) Applicants: Mitsubishi Electric Research Laboratories, Inc., Cambridge, MA (US); Mitsubishi Electric Corporation, Chiyoda-ku, Tokyo (JP)

(72) Inventors: Chunjie Duan, Brookline, MA (US); Ghulam Bhatti, Mansfield, MA (US); Kieran Parsons, Cambridge, MA (US); Kazuumi Koguchi, Tokyo (JP); Soichiro Kametani, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 52 days.

(21) Appl. No.: 14/226,208

(22) Filed: Mar. 26, 2014

(65) Prior Publication Data

US 2015/0280966 A1    Oct. 1, 2015

(51) Int. Cl.
| | |
|---|---|
| H04J 14/00 | (2006.01) |
| H04B 10/00 | (2013.01) |
| H04L 12/24 | (2006.01) |
| H04Q 11/00 | (2006.01) |
| H04L 1/22 | (2006.01) |

(52) U.S. Cl.
CPC ............ *H04L 41/042* (2013.01); *H04L 1/22* (2013.01); *H04Q 11/0066* (2013.01); *H04Q 2011/0079* (2013.01); *H04Q 2011/0081* (2013.01)

(58) Field of Classification Search
CPC . H04J 14/0287; H04J 14/0289; H04J 14/029; H04J 14/0291; H04J 14/0293; H04J 14/0294; H04J 14/0295; H04J 14/0297; H04L 41/042; H04L 1/22; H04Q 11/0066; H04Q 2011/0081; H04Q 2011/0079
USPC .............................................. 398/1–8, 45–57
See application file for complete search history.

(56) References Cited

U.S. PATENT DOCUMENTS

| | | | |
|---|---|---|---|
| 4,967,405 A | 10/1990 | Upp et al. | |
| 6,578,092 B1 * | 6/2003 | Lau et al. | 710/29 |
| 6,999,677 B2 * | 2/2006 | Graves et al. | 398/5 |
| 7,110,394 B1 * | 9/2006 | Chamdani et al. | 370/355 |
| 7,162,116 B1 * | 1/2007 | Vukovic et al. | 385/17 |
| 7,245,582 B1 * | 7/2007 | Roberts | H04J 14/0227 370/217 |
| 7,366,370 B2 * | 4/2008 | Goodwill | H04B 10/801 385/24 |
| 8,284,654 B2 * | 10/2012 | Bitar | 370/216 |
| 8,559,453 B2 * | 10/2013 | Kuramoto | H04L 41/12 370/401 |

(Continued)

*Primary Examiner* — Ken Vanderpuye
*Assistant Examiner* — Dibson Sanchez
(74) *Attorney, Agent, or Firm* — Dirk Brinkman; Gene Vinokur

(57) ABSTRACT

An optical channel data unit (ODU) switch includes a set of two or more client cards, a set of two or more line cards, and a set of two or more switch cards. Each switch card is connected to all client cards, all line cards, and all other switch cards, and each client card, line card and switch card includes control logic for managing an operation of the ODU switch in a distributed manner.

11 Claims, 7 Drawing Sheets

(56) References Cited

U.S. PATENT DOCUMENTS

| | | | |
|---|---|---|---|
| 9,043,911 B1* | 5/2015 | Chen et al. ............... 726/23 |
| 2002/0095498 A1* | 7/2002 | Chanda et al. ............ 709/225 |
| 2003/0058854 A1* | 3/2003 | Cote ............... H04L 12/5601 |
| | | 370/389 |
| 2004/0105383 A1* | 6/2004 | Agrawal et al. ............ 370/228 |
| 2004/0202171 A1* | 10/2004 | Hama ............. H04L 12/4641 |
| | | 370/395.1 |
| 2005/0135436 A1* | 6/2005 | Nigam ............... H04J 3/1617 |
| | | 398/99 |
| 2006/0222361 A1* | 10/2006 | Aoki ............... H04Q 11/0005 |
| | | 398/51 |
| 2007/0268915 A1* | 11/2007 | Zelig et al. ............... 370/401 |
| 2009/0175281 A1* | 7/2009 | Higuchi et al. ............ 370/401 |
| 2010/0085982 A1* | 4/2010 | Martinotti et al. ........ 370/420 |
| 2010/0290469 A1* | 11/2010 | Assarpour ............... 370/392 |
| 2012/0243868 A1* | 9/2012 | Meyer ............. H04Q 11/0005 |
| | | 398/46 |

* cited by examiner

OPTICAL CHANNEL DATA UNIT SWITCH WITH DISTRIBUTED CONTROL

FIELD OF THE INVENTION

This invention relates generally to optical communication, and more particularly to the switching of optical channel data units.

BACKGROUND OF THE INVENTION

Optical multiplexing and switching devices are used for high speed data communications over long distances. Standards, such as ITU-T G.709 and IEEE 802.3 100 G Ethernet, enable communications of large volumes of data. ITU-T defines an Optical Transport Network (OTN) as a set of Optical Network Elements (ONE) connected by optical fiber links, able to provide functionality of transport, multiplexing, switching, management, supervision and survivability of optical channels carrying client data. The client data can be generated from Gigabit or higher rate Ethernet cards and mapped to OTN signals before transmission, or several low order Optical channel Data Unit (ODU) which are multiplexed to a high order ODU before transmission. The signals are received and processed by device nodes. The processing can in multiplexing, de-multiplexing, and switching operations.

As shown in FIG. 1, an Optical channel Data Unit (ODU) switch node 100 can include client cards 110, line cards 120, and a switch card 130. Other variations of the ODU switch 150, as shown in FIG. 2, only have line cards. However, the underlying operational principles are similar, i.e., inputting ODU signals, switching, multiplexing/de-multiplexing the signals, and then outputting the ODU signals. Conventionally, only one switch card or a Clos network of multiple switch cards is used, e.g., see U.S. Pat. No. 4,967,405. All data passes through the single switch card. Hence, the switch card can be a single point of failure. Therefore, it is desired to increase the reliability of the ODU switch.

One way to increase reliability is with optical link redundancy; this is called 1+1 protection, which can increase costs and network overhead.

Redundant switches are also known. A simple architecture uses primary and standby switch cards. All data are normally switched by the primary card. If a, usually centralized, monitoring or control mechanism detects a failure, then the standby switch card is activated. This is called 1:1 switch protection. A more sophisticated architecture has N+K switch cards. N switch cards are normally functional at any given time, and K switch cards are in standby mode. If one of the N cards fails, then one of the K standby cards is activated. Any delays in detecting a failure and switching to the standby card can result in a loss of a significant amount of data.

Redundancy has also been used for increased throughput and load balancing. In this architecture, the data are distributed, over multiple parallel switch cards that run in parallel. However, parallel cards do not necessarily increase reliability. In fact, the probability of card failures is increased to decrease reliability.

SUMMARY OF THE INVENTION

The embodiments of the invention, provide a system and method for operating and communicating data using an optical channel data unit switch with distributed control. The embodiments use redundant resources and a distributed monitoring and control mechanism. By monitoring local, entry points, the invention enables the system to rapidly switch to a standby path in case of a failure on a primary path. The invention also teaches a method to achieve a managed switch-over when a partially faulty switch card is detected. A joint decision making capability enables high reliability.

DETAILED DESCRIPTION OF THE PREFERRED EMBODIMENTS

Optical Channel Data Unit (ODU) Switch Node

Figure 1:
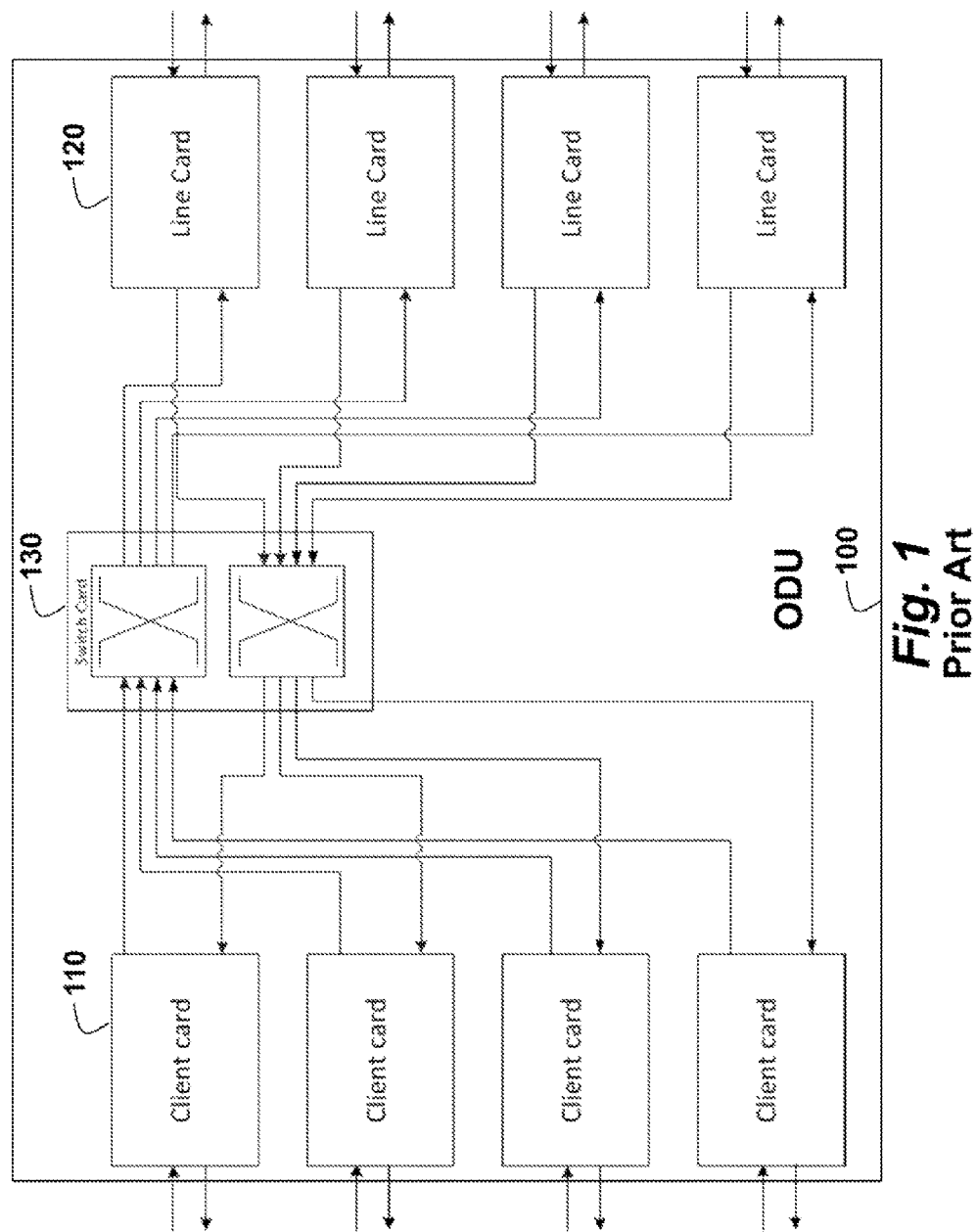
FIG. 1 is a schematic of a conventional optical channel data unit (ODU) switch node with a single switch card connected to multiple client and line cards.
Figure 2:
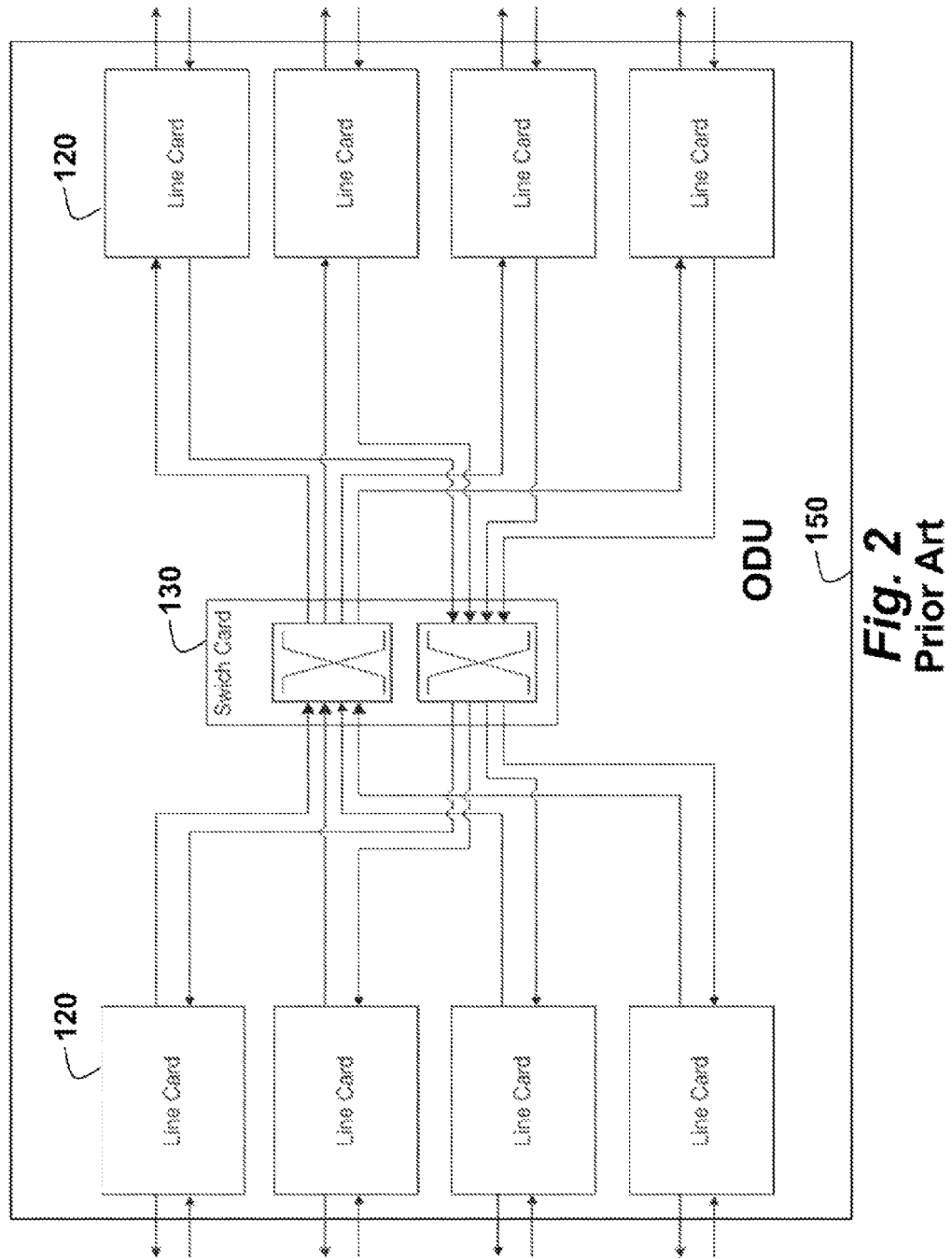
FIG. 2 is a schematic of a conventional ODU switch node with a single switch card connected to multiple line cards.
Figure 3:
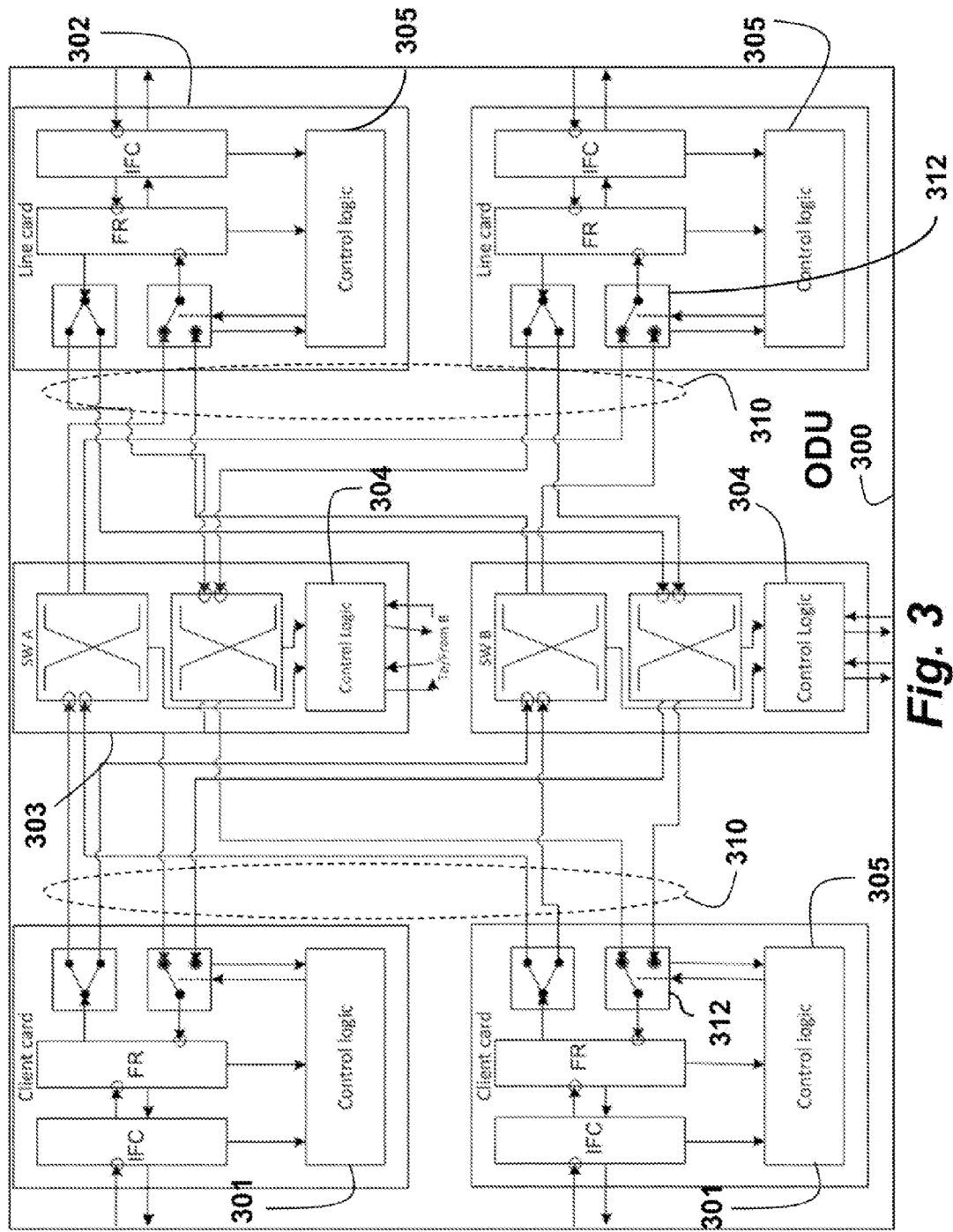
FIG. 3 is a schematic of an ODU switch node showing data lines according to embodiments of the invention.

FIG. 3 is a schematic of an optical channel data unit (ODU) switch node 300 according to embodiments of the invention. The client cards and line cards include interface (IFC) modules, frame processing (FR) modules and control logic.

The ODU switch node includes a set of two or more client cards 301 on an input side, a set of two or more line cards 302 on an output side, and a set of two or more switch cards (SW A and SW B) 302 connected by data lines 310. Each switch card can support multiple, e.g., four, client and line cards. Each switch card includes control logic 204, and each client and line card includes control logic 305, both described in greater detail below. It is noted that client cards can be replace by line cards so that the ODU switch node only include sets of line cards on the input and output sides.

For upstream traffic, when the data flows from the input side to the output side, some of the client signals can first be mapped to ODU signals by the FR block. Multiple copies of the signals are then generated on the client card, one for each switch cards. Each switch card independently switches the signals according to their destination specifications, and output signals from the switch cards are forwarded to the line cards. Thus, each line card receives multiple two (or more) copies of the same signal, one from each switch card. The line card selects one of the signals for multiplexing. The frame processing block then put the multiplexed signal into frames and transmission onto an output line. The downstream traffic flowing from the line side to the client side is handled in a similar manner.

Control Lines

Figure 4:
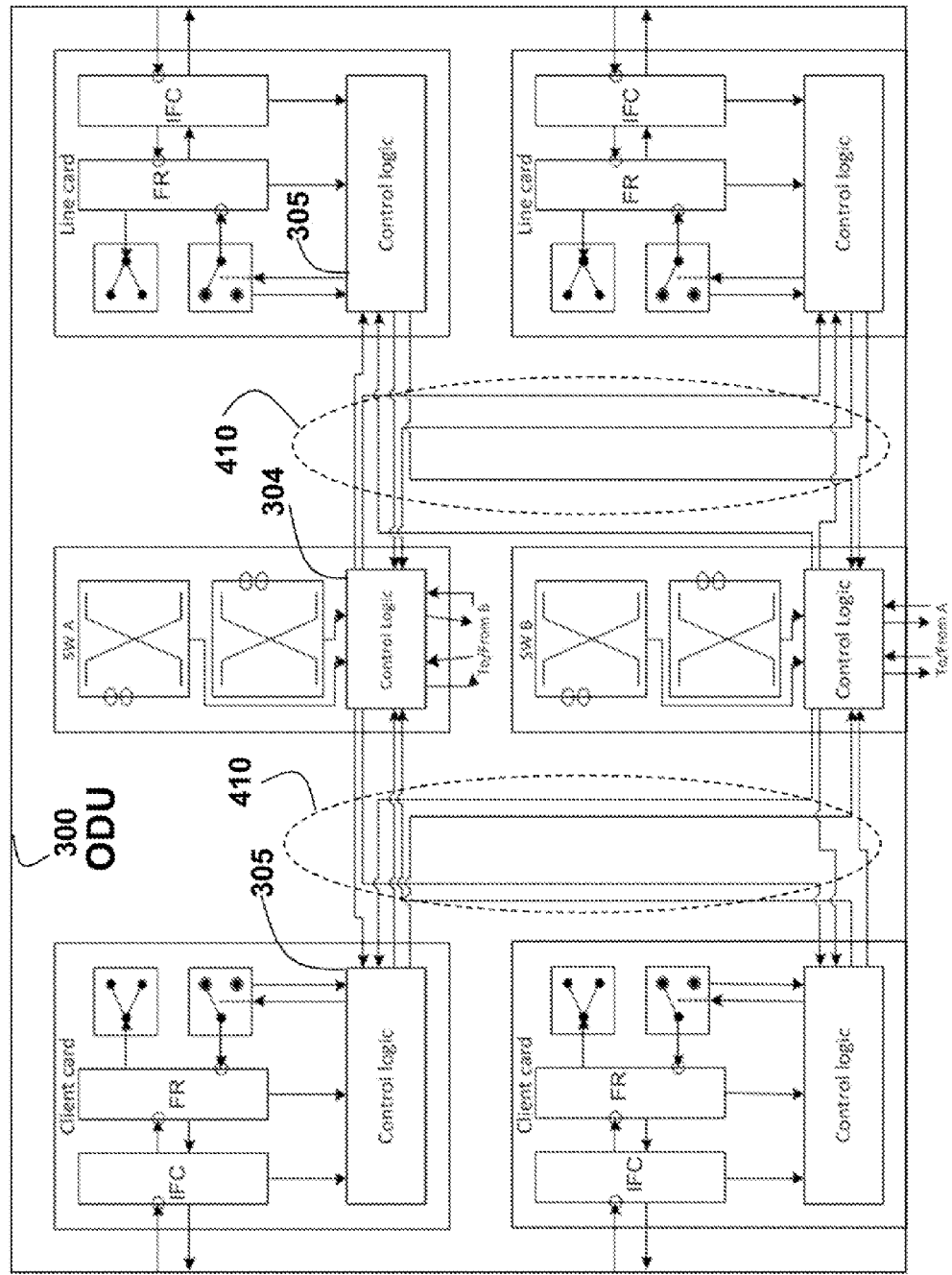
FIG. 4 is a schematic of the ODU switch node showing control lines according to embodiments of the invention.

FIG. 4 shows the control lines 410 connecting control logic 404-305. The control logics communicate with each other, but each operates independently. The switch cards are interconnected (e.g., To/From A and To/From B) for exchanges of control and status information. The information is used to construct a state machine that defines state transitions of the ODU switch based on input messages, and associated actions.

As part of the functioning of the state machine, the switch cards send control commands to the line and client cards accordingly.

Each line card and client card includes the control logic 305 that receives commands from the switch card control logic 304. The control logic selects an input from the one of the switch cards to connect to the output, based on the command.

When a line card or a client card receives two control commands that are contradicting, only the command that has a highest reliability is processed, e.g., the reliability can be determined according to a total weight of a condition indicator. The control logic 305 on the client and line cards send state information to the switch card control logic 304. The client and line cards can select a traffic source from different switch cards. If all switch cards are functioning normally, the switch control logic can gradually move traffic to the primary (active) switch card in a managed manner.

Switch Card Connectivity

Figure 5:
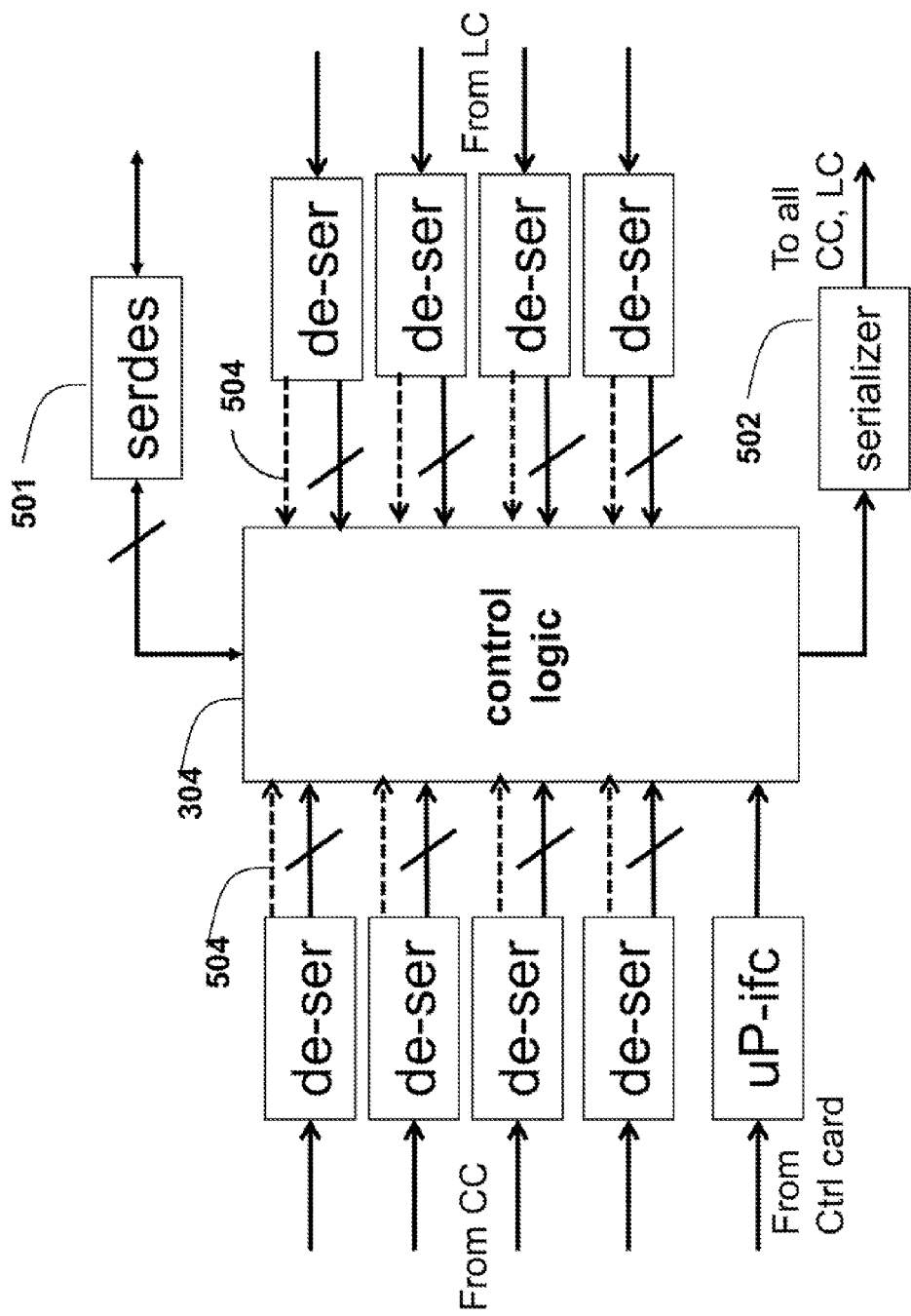
FIG. 5 is a schematic of connectivity of a switch card according to embodiments of the invention.

The control logic 304 of the switch card shown in FIG. 5 generates the control signal (commands) based on a plurality of inputs from client cards and line cards. The inputs from other cards are serialized, transmitted to the switch card, and deserialized by the de-serializer (de-ser) on the switch card.

The outputs of the control logic 304 are converted into serial data by the serializer 502 before sent to all client and line cards. The control logic 304 also generate necessary signals indicating its state, and serialize and transmit these signals to the other switch card in the unit. The serializer-deserializer (SERDES) 501 is responsible for conversion between serialized and parallel signals.

Additionally, the control logic also interface with the control card via the micro-processor interface (uP-ifc). The control card can read the state of the control logic, and also update the state of the control logic.

Assuming the switch unit includes of N client cards and M line cards, there are N+M+1 serial inputs. The control logic 304 takes the inputs (deserialized from the N+M+1 lines) and generates a new state based on the current global state and updates the control output based on the new states. All inputs are used in computation of the new state. It is possible to assign different weights to these inputs (condition indicators) based on the severity of these indicators. The control logic can generate soft and/or hard decisions. As an example, the reliability condition for the $k^{th}$ switch path can be expressed as a weighted summation of all inputs $$d_k = \Sigma(w_{k,j} L_{k,j}) + W_0 L_0,$$

where
a. $w_{k,j}$: weight for the $j^{th}$ condition indicator of the $k^{th}$ path,
b. $L_{k,j}$: $j^{th}$ condition indicator of the $k^{th}$ path,
c. $W_0$: weight for the other switch card, and
d. $L_0$: condition of the other switch card.

In the case a serial link stops functioning, the control logic does not accept inputs from the given link. This is achieved by monitoring the signal integrity and condition 504 of the deserializer, such as loss-of-signal, loss-of-synchronization and etc. For example, the loss of signal (LOS) of a deserializer is reported to the control logic 305. The LOS detection is used by the local control logic 305 and switch card control logic 304 for control decision.

Client and Line Cards

Figure 6:
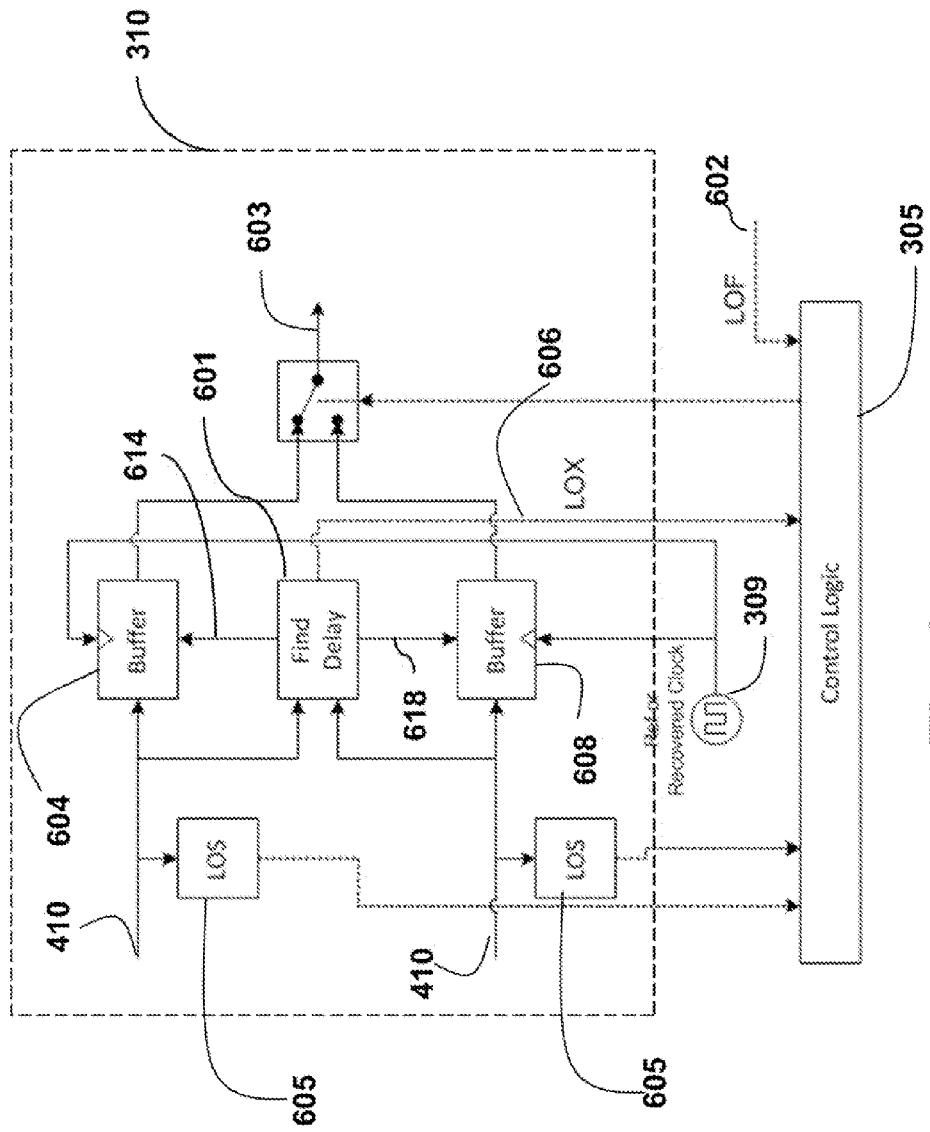
FIG. 6 is a schematic of a switch card according to embodiments of the invention.

It is essential that the data streams from two different paths line up perfectly to allow 'hitless switching,' i.e., a card switch from one input to another input without losing any data. FIG. 6 shows the alignment-selection block 312. The block 312 includes a first buffer 604 for storing input data 410 from one switch card, and a second buffer 608 for storing input data 410 from a second switch card. A delay search block 601 compares two inputs 410 and determines the delays between the streams. The search block 601 then generates control signals 614 and 618, which adjust the delays in buffer 604 and 608 respectively. The output data streams of buffers 604 and 608 are time aligned and fed into a selection circuit 603 controlled by the control logic 305.

Figure 7:
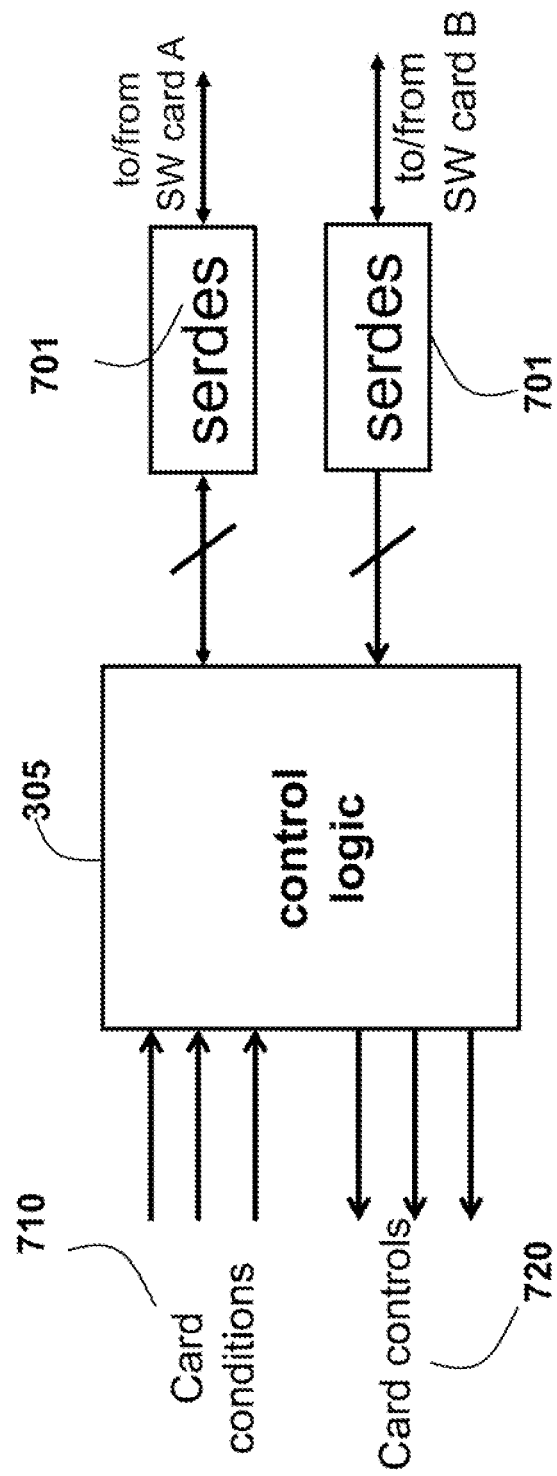
FIG. 7 is a schematic of connectivity of client and line cards according to embodiments of the invention.

FIG. 7 shows details of the control logic 305 of the client and line cards 301-302. The control logic block for the client and line cards is simpler than the one for switch card. There are a set of serdes lines 701, one for each switch card, e.g., SW A and SW B. These lines are used to transmit control information to and from the switch cards in the form of loss of signal (LOS) and loss of frame (LOF), and other status-reporting messages, such as client/line card conditions 710 and card controls 720, which can be defined as and when needed in a particular application. The control logic can be implemented using a local micro-processor or an external controller to determine data alignment and line selection.

Operational Description

As described above, there are multiple copies, e.g., two, of all data signals going into the switch card and coming out from the switch card. Specifically, every data signal received by the switch card from the client and line cards is replicated on two (or more) data lines, one going to each switch card. Similarly, there are two copies of out going signals arriving at the client and line cards, one from each switch card. The switch cards perform switching concurrently and independently. Each client and line card selects one of the received copies for processing. This selection is based on certain predetermined criteria. However, at any given time, it is possible that different line cards can be selecting signals from different switch cards. The same applies to the client cards. Because each switch cards performs switching on its copy of the input signal, the output signal is identical, unless one or more of the switch cards are malfunctioning.

The system and method as described herein enable increased flexibility and reliability. If a switch card, for example, malfunctions only partially, thus, affecting a subset of client or line cards, then the system remains operational because the affected client and line, cards still have alternate copies of the signals received from the one or more other switch cards. A partial malfunction can be reported to the switch cards.

An automatic (or semi-automatic) recovery mechanism can perform a managed switch over from the malfunctioning switch card. After a successful switch over, remedial steps (including, but not confined to, a soft/hard reset and/or physical replacement of the malfunctioning card) can be taken to rectify the issue.

The system also provides protection against sudden and complete failure of one of the switch cards. In such a case, the affected client and line cards, which were processing the signals from the failed called, switch over to process the signals received from the other switch cards. The invention, allows two cases to deal with such a situation.

In the first simpler case, no extra mechanism for signal alignment is needed. After detecting the failure of one switch card, the affected client/line cards simply start processing the signals from the other switch card, i.e., the functional card. Some of the data can be lost (or processed twice) during this switch over. In the second case, the signals arriving from the two switch cards are buffered and aligned by the client and line cards as described above. After a failure of one switch card is detected, processing of signal from the other card starts from the previous alignment mark. In that way, in no data are lost, processed or framed multiple times.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An optical channel data unit (ODU) switch, comprising:
   a set of two or more client cards;
   a set of two or more line cards; and
   a set of two or more switch cards, wherein each switch card is connected to all client cards, all line cards, and all other switch cards, and wherein each client card, line card and switch card includes control logic for managing an operation of the ODU switch in a distributed manner, and wherein a reliability of a kth switch path is expressed as a weighted summation of all inputs $d_k = \Sigma(w_{k,j} L_{k,j}) + W_0 L_0$ for the set of two or more switch cards, where $w_{k,j}$ is a weight for a jth condition indicator of a kth path, $L_{k,j}$ is a jth condition indicator of the kth path, $W_0$ is a weight for an other switch card, and $L_0$ is a condition of the other switch card.

2. The ODU switch of claim 1, wherein the switch cards operate concurrently and independently.

3. The ODU switch of claim 1, wherein each switch card maintains a state of the ODU switch, and wherein each switch card reports the state to other switch cards.

4. The ODU switch of claim 3, wherein state transitions of the ODU switch are based on input messages, and associated actions.

5. The ODU switch of claim 1, wherein each client card or line card receives a command from each switch card, and only processing the command that has a highest reliability.

6. The ODU switch of claim 5, wherein the control logic selects an input from the one of the switch cards to connect to an output, based on the command.

7. The ODU switch of claim 1, wherein each client card sends and receives data to and from all switch cards.

8. The ODU switch of claim 1, wherein the client cards are replaced by line cards.

9. The ODU of claim 1, wherein a control card reads a state of the control logic, and updates the state of the control logic.

10. The ODU switch of claim 1, further comprising:
    aligning inputs in time from different switch cards in time at the client and line cards.

11. The ODU switch of claim 1, wherein inputs to the ODU switch are buffered at the client and line cards so no data are lost after a failure.

* * * * *